Figure 4:
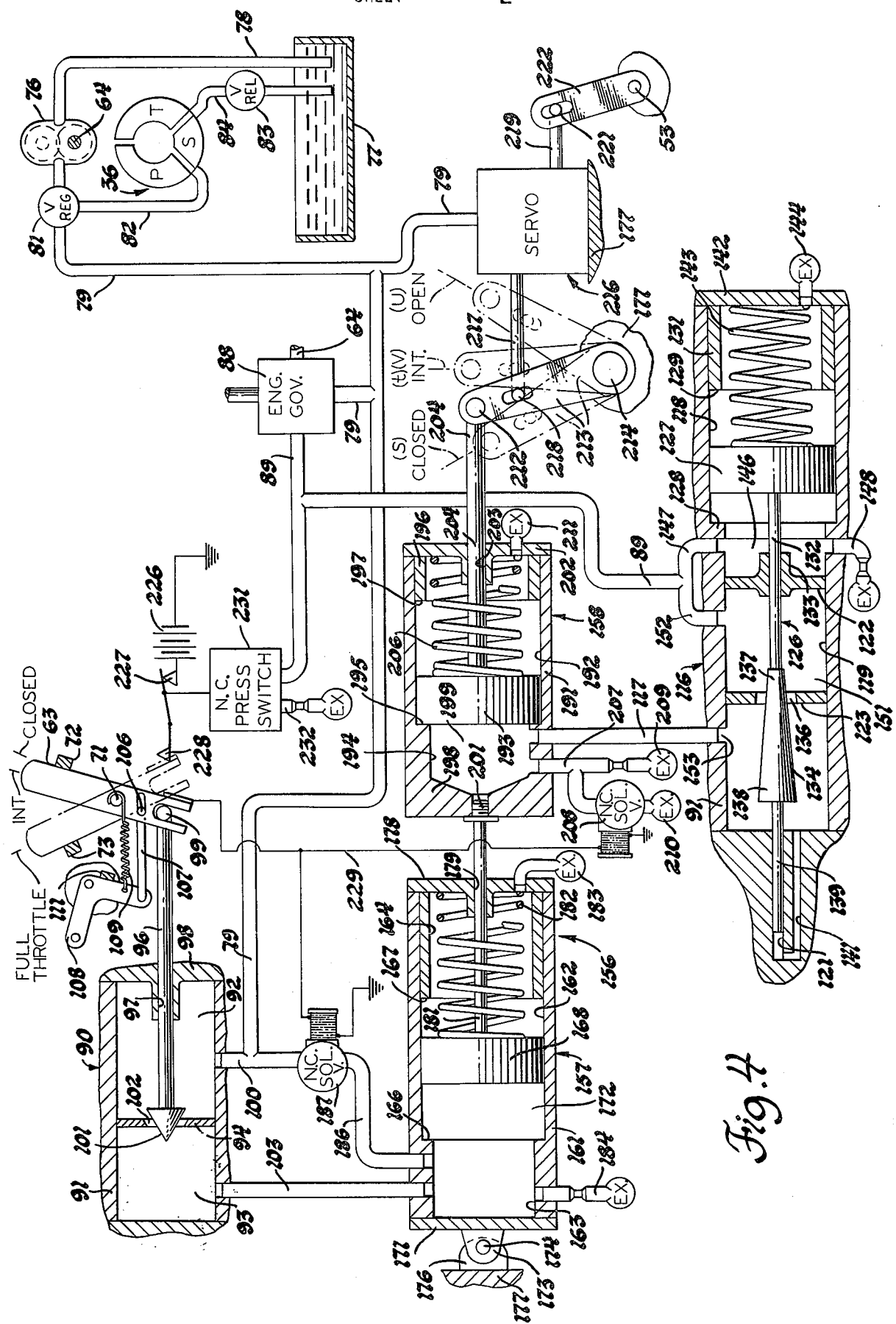

United States Patent [19]
Amann et al.

[11] 3,886,729
[45] June 3, 1975

[54] GAS TURBINE WITH THROTTLE RESPONSIVE HYDROKINETIC TORQUE CONVERTER AND THROTTLE RESPONSIVE HYDROKINETIC TORQUE CONVERTER

[75] Inventors: Charles A. Amann, Bloomfield Hills; David C. Sheridan, Utica, both of Mich.

[73] Assignee: General Motors Corporation, Detroit, Mich.

[22] Filed: Aug. 30, 1973

[21] Appl. No.: 392,855

[52] U.S. Cl. ................ 60/39.24; 60/332; 60/336; 60/354
[51] Int. Cl. ................... F02d 9/02; F16d 33/04
[58] Field of Search ......... 60/332, 361, 39.24, 356, 60/354

[56] References Cited
UNITED STATES PATENTS

| 2,911,785 | 11/1959 | Kelley et al. | 60/354 |
| 2,911,786 | 11/1959 | Kelley | 60/356 |
| 2,957,370 | 10/1960 | Kelley et al. | 60/332 |
| 2,995,955 | 8/1961 | Kelley | 74/677 |
| 3,188,807 | 6/1965 | Rogers | 60/39.16 |
| 3,192,719 | 7/1965 | Kronogard | 60/361 |
| 3,346,082 | 10/1967 | Dean | 60/354 |
| 3,358,444 | 12/1967 | Tuck | 60/354 |
| 3,425,220 | 2/1969 | Egbert et al. | 60/354 |
| 3,455,407 | 7/1969 | Phillips | 60/332 |
| 3,486,329 | 12/1969 | McLean | 60/39.24 |

OTHER PUBLICATIONS

Kronogard et al., Matching Gas Turbine Propulsion Systems to Vehicles, SAE Paper 680539, Aug. 1968.
Kronogard, Turbine Transmission Systems for Automotive and Industrial Traction Applications, SAE paper 660762, Oct. 1966.
McLean, Case for the Single Shaft Vehicular Gas Turbine Engine, Technical Advances In Gas Turbine Design, Paper 16, Warwick 9-11th April 1969, I.S.M.E., London, England.

Primary Examiner—C. J. Husar
Assistant Examiner—Warren Olsen
Attorney, Agent, or Firm—A. M. Heiter

[57] ABSTRACT

A gas turbine having a compressor and a turbine mounted on a single shaft and a throttle actuated fuel control responsive to parameters as compressor discharge pressure, engine speed and temperature to provide power increasing with engine speed as the throttle is advanced to a maximum limited by the fuel control. The engine drives a hydrodynamic torque converter having power absorption or capacity characteristics varying as a function of engine or input speed and substantially independent of output speed having variable pitch stator blades movable from a full power capacity position through a range of intermediate power capacity positions to a minimum power capacity position controlled as a function of throttle position and engine speed. When the throttle is in a closed position the fuel control provides starting or idle fuel feed and the stator control provides minimum capacity position of the stator blades for low drag during engine starting and low creep during engine idling. When the throttle is advanced to full throttle position the fuel control provides under steady state operating conditions power increasing with throttle advancement up to the maximum rated power and the stator control controls stator blade angle to provide torque converter capacity matching engine power. When the throttle is quickly advanced from some partial position to full throttle for maximum acceleration, the stator vanes are switched to an intermediate capacity position for acceleration up to maximum engine speed and then returned to the above steady state control mode.

19 Claims, 4 Drawing Figures

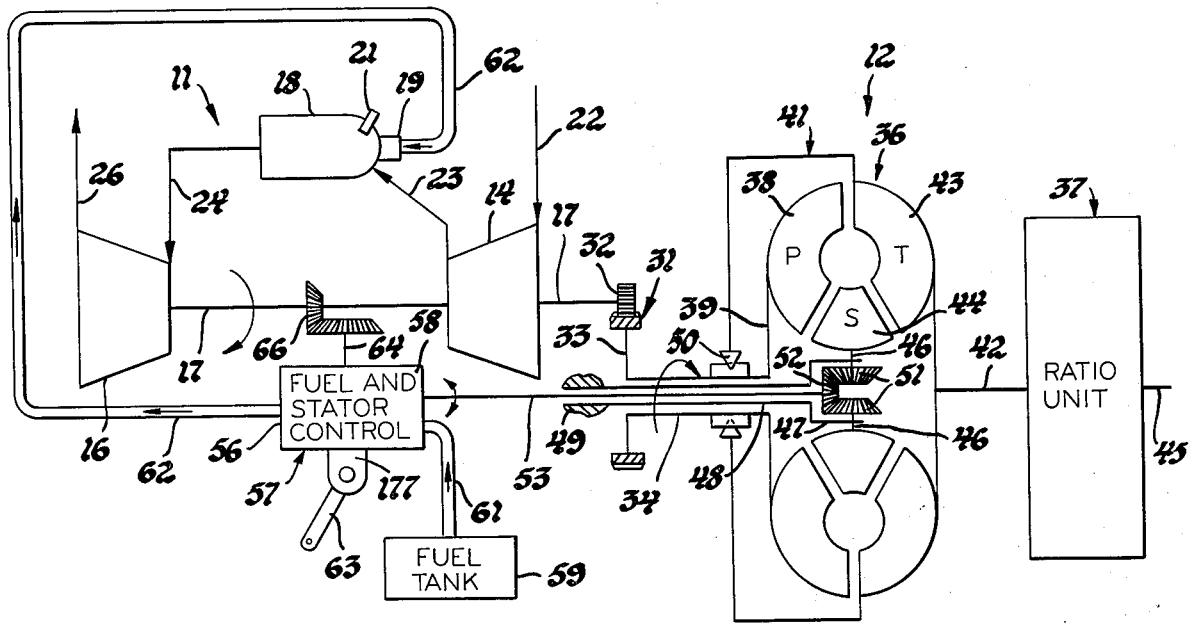

GAS TURBINE WITH THROTTLE RESPONSIVE HYDROKINETIC TORQUE CONVERTER AND THROTTLE RESPONSIVE HYDROKINETIC TORQUE CONVERTER

SUMMARY OF THE INVENTION

This invention relates to power trains having an engine and a transmission and particularly a variable ratio transmission.

Combustion engines, according to their type, reciprocating, two shaft gas turbine and single gas turbine each have typical performance characteristics, output power and torque varying relative to engine speed affecting vehicle acceleration and drive. Such engines provide a maximum power increasing with increasing engine speed and maximum rated power at rated engine speed at full throttle or full fuel feed and reduced power at reduced throttle settings or fuel feed rates. The engine, during steady state operation, will produce only the amount of power that the transmission will absorb which is determined by transmission power capacity. The engine output power is controlled by the fuel control and the transmission capacity control. The transmission has means to vary the power capacity with increasing engine or transmission input speed in the same relationship as the maximum engine power varies with engine speed so that all engine power can be transmitted to the load such as a vehicle drive. Transmission power capacity controls responsive to engine parameters, such as engine speed and torque demand, i.e., throttle position, are employed to control the transmission power capacity so it increases with engine speed in a substantially matching relationship to engine power as it increases with increasing engine speed. An exact match is preferably provided at maximum rated power at rated speed. At lower power and speeds a transmission power capacity slightly less than engine power is acceptable.

Single shaft gas turbine engines have characteristic maximum power curves and torque, limited by maximum allowable turbine temperature, that are not particularly suitable for normal vehicle transmission drives, such maximum power curves increase at higher rates and, at higher engine speeds, increase at slightly lower rates than the hydrokinetic torque converter power capacity curve. In order to match the torque converter power capacity curve to the engine power capacity curve, a torque converter having power capacity responsive substantially only to engine speed is preferred. The torque converter has a maximum rated power capacity at rated engine speed, equal to or matching the maximum rated engine power for steady state operation at rated speed so maximum engine power is fully utilized. As engine power and speed are reduced, the torque converter power capacity curve is only slightly under the engine power curve in the higher speed and power range so substantially all engine power can be used to drive the load. In the lower power and speed range, the torque converter power capacity is higher than engine power which would overload the engine. Under an overload, the increased engine power would cause excessive turbine temperature. If the fuel control, i.e., responding to overtemperature, prevented an increase of engine power, the overload would cause the engine to stall. To avoid such operation the torque converter capacity is reduced to match or be slightly less than engine power. The torque converter power capacity is varied by a stator having variable angle vanes which are infinitely variably controlled between the fully opened maximum power capacity position and a closed minimum power capacity position. The engine fuel feed control and stator control actuates a stator control shaft which extends through a grounded sleeve shaft which also extends through the input sleeve shaft. The grounded sleeve shaft has a carrier rotated by supporting the vanes for angular movement. The control shaft is connected to the vanes to control vane angle. A stator vane position control system, responsive to torque demand, throttle position and engine speed, controls the stator vane position to control torque converter power capacity to substantially match engine power. The throttle has movement from a closed position to an intermediate position and jointly controls the engine fuel feed control to provide a low speed range for starting, such as idle speed and minimum to low power and the stator control to move the stator blades respectively from closed minimum power capacity position to intermediate or low power capacity position at the low engine speed. The torque converter capacity with the vanes in the closed position provides minimum drag while starting the engine and minimum torque or vehicle creep during engine idling. As the throttle moves to intermediate position the vanes are opened as a function of throttle position to the intermediate power capacity position to gradually increase transmission power capacity and thus engine power to the low value substantially matching the available engine power at idle speed for a smooth good performance vehicle start. Further movement of the throttle from intermediate position to the full throttle position has no further effect on the stator control but increases fuel feed to increase engine power and speed to the rated maximum values.

As engine speed increases from idle speed in the low speed range a speed signal gradually further increases stator vane opening to the full capacity opening, to correct for the excess of torque converter power capacity relative to maximum rated engine power to maintain the torque converter power capacity at a value equal or slightly less than engine power until full torque converter power capacity is equal or slightly less than engine power in the middle engine speed range. This capacity correction is large at idle speed and gradually diminishes in the low speed range to provide a smooth change of torque converter power capacity always less or matching engine power and a match at full rated engine power and speed.

When the throttle is quickly moved from any intermediate position to full throttle position, the vanes are partially closed to a low capacity high performance position, which may be the same intermediate position used during vehicle initial drive, until the engine accelerates more quickly to maximum rated speed or the throttle is moved from full throttle position to a lower position.

The vane angle control system, for steady-state operation, has a throttle pressure signal regulator, an engine speed signal regulator, a throttle signal responsive positioner and a speed signal responsive positioner. The speed signal regulator provides a throttle position signal pressure increasing as a function of throttle position as the throttle moves from closed position to intermediate position. The speed signal regulator has a speed governor providing a governor signal and a modifier regulator modifying the governor signal to provide a speed signal increasing at a controlled rate as engine speed increases from idle speed through a low speed range to reduce torque converter power capacity to engine power. The throttle positioner and the speed positioner are connected in series and both are spring biased in the absence of signal pressures, to position the vanes in the closed position. The throttle positioner in response to throttle signal pressure increasing as the throttle moves from closed position to intermediate position, moves against the spring bias through its complete stroke to a stop to move the vanes from closed position to the intermediate position for starting to drive the vehicle. The speed positioner at low or idle speed remains in the closed position and as speed and the speed signal increase in the low speed range moves against the spring bias to further open the vanes from the intermediate position to the open full capacity position at a speed at which full torque converter power capacity is not greater than engine power.

Quick advancement of the throttle to full throttle by an electric circuit through a normally closed speed switch and a throttle switch only closed at full throttle energizes solenoid valves to increase the throttle signal to main line pressure and disable the speed signal so the throttle positioner places the vanes in the intermediate position for high performance at higher speeds and the speed positioner is inactivated. When the engine speed reaches rated speed the speed switch is opened by governor pressure to return the system to the steady-state operating mode which at full throttle and rated speed would be the full capacity position. Reducing the throttle from the full throttle position opens the throttle switch to restore the steady-state operating mode.

These and other features of the invention are described in detail in the following description and accompanying drawings.

FIG. 1 is a schematic diagram of a power train including a gas turbine engine and power train, FIG. 2 is a graph showing engine and transmission power characteristics relative to engine speed, FIG. 3 is a graph showing engine speed and stator vane opening relative to throttle position, and FIG. 4 is a schematic diagram of the stator opening control system.

Referring to FIG. 1, the power train includes a gas turbine engine 11 and a transmission 12. The conventional single shaft type gas turbine engine has a compressor 14 and a turbine 16 drive connected by a common shaft 17. The combustor 18 has a fuel nozzle 19 and igniter 21. Conventional housing structures guide gas flow as indicated by the arrows. Ambient air, arrow 22, enters the compressor and is discharged under pressure, arrow 23, to the combustor to provide high temperature gas. This gas generating apparatus delivers the high temperature gas, arrow 24, to the turbine 16 which has an exhaust, arrow 26.

Reduction gearing 31 having a pinion 32 fixed to shaft 17 and a gear 33 fixed to transmission input sleeve shaft 34 drives the transmission 12. The transmission has a hydrodynamic torque converter transmission unit 36 and may include a multi-ratio drive transmission unit 37 such as an infinitely variable friction or hydrostatic transmission or a multiratio gear unit having manual or automatic controls. The torque converter 36 has a pump 38 mounted by hub 39 on input shaft 34 located within the rotary housing 41 which is drive connected to the torque converter output shaft 42. The torque converter turbine 43 is mounted within and on housing 41 and receives fluid from pump 38 and delivers it in the normal helical toroidal flow path to the stator blades or vanes 44. The torque converter power absorption characteristics or capacity are dependent on input speed and nearly independent of output speed. In this type of three element torque converter with a radial in flow turbine a pump with increased forward, in the direction of pump rotation, curved blades at the discharge end and stator blades providing prewhirl ahead of the pump opposing pump rotation provides capacity essentially dependent on input speed. In a three element torque converter having a radial out-flow turbine, a pump having backward, opposite pump rotation, curves blades at the discharge and stator blades providing prewhirl ahead of the pump in the direction of pump rotation provides capacity essentially dependent on input speed. Each stator vane 44 is fixed to, and hydrodynamically balanced under mean operating conditions, a pivot shaft 46. Each pivot shaft extends radially inward and is rotatably mounted in a fixed hollow carrier 47 secured to a sleeve support shaft 48 extending through sleeve shaft 34 and fixed to a frame portion 49 to ground the stator. Each stator vane pivot shaft 46 is fixed to a bevel gear 51 located inside the hollow carrier. All vane bevel gears 51 mesh with a control bevel gear 52 fixed on a control shaft 53 extending through sleeve support shaft 48 to the stator control 56 of the fuel and stator control 57. The stator control 56 rotates and positions the control shaft 53 to vary the angle of the stator vanes 44 to vary the capacity of the torque converter. The torque converter output shaft 42 may be a load shaft or may be connected by ratio unit 37 to the final output or load shaft 45. On load or vehicle overrun the turbine housing 41 is connected by one way clutch 50 to drive input shaft 34 and the engine for engine braking.

The fuel and stator control 57 also includes a conventional fuel control 58 which receives fuel from fuel tank 59 through pipe 61 and delivers fuel through pipe 62 to nozzle 19. Both the fuel control 58 and the stator control 56 are controlled by a throttle lever 63 conventionally connected by linkage to a manual control such as a foot pedal. The engine governor drive shaft 64 is connected by the bevel gear set 66 for drive by engine shaft 17. The conventional fuel control 58 on advancing the throttle provides gas turbine engine power increasing on curve A, FIG. 2, for maximum power, determined by the highest turbine inlet temperature tolerated by the engine during steady state operation with increasing engine output speed. Engine rated power is achieved at point U at the upper extremity of curve A at rated engine output speed. If the engine fuel flow rate is reduced to decrease turbine inlet temperature, less power is developed by the engine. At some constant temperature less than the maximum allowable temperature of curve A, an intermediate temperature, less power, an intermediate power varies with engine speed as indicated by curve B. At a low turbine inlet temperature provided by a further reduction of fuel feed, low power varies with engine speed as shown by curve C. The intermediate and low power curves increase at a lower rate with increasing speed. Thus a gas turbine engine can be made to produce, during steady state operation, any combination of power and speed below maximum power and speed curve A, by controlling turbine inlet temperature through appropriate manipulation or control of fuel flow by manual control or manual controls with automatic limit controls. Such engine characteristics are discussed in the Society of Automotive Engineers Paper No. 720,758 dated Sept. 11 to 14, 1972 entitled "Acceleration of a Passenger Car Powered by a Fixed Geometry Single Shaft Gas Turbine Engine" by S. G. Liddle, D. C. Sheridan and C. A. Amann, incorporated by reference herein.

Such conventional fuel feed controls are supplied with signals of throttle position, engine speed, engine turbine inlet temperature and ambient air pressure and temperature to continually monitor or control fuel feed rate to maintain engine speed at the level signalled or selected by the throttle position. When the throttle lever 63 is between closed and intermediate positions, the governor maintains engine idle speed, while engine power increases as the stator vanes in the torque converter open from a closed position S to an intermediate position T. Since opening the stator vanes increases the engine power absorbed by the torque converter pump, this action requires the governor to increase engine fuel feed to maintain idle speed. As the throttle is moved past intermediate position T to full throttle U, both the stator vanes and engine speed change concurrently in relation to throttle position. The fuel control protects the engine against excessive turbine inlet temperature limiting maximum power curve A. It maintains the proper fuel feed rate during acceleration, engine malfunction, deceleration, change of ambient conditions and start-up as required. A suitable engine fuel feed control is shown in U.S. Pat. No. 2,689,606, Mock, patented Sept. 21, 1954 incorporated herein by reference.

The stator control 56, shown in FIG. 4, is controlled manually by a throttle lever 63 and by engine speed governor 88. The manually controlled throttle lever 63 is pivotally mounted on a pivot 71 fixed on a support housing 177. The throttle lever 63 has movement from a closed position through an intermediate position to a full throttle position limited by stops 72 and 73 mounted on the support housing 177. The fluid supply for the stator control may be provided by the engine control fluid supply and may provide the fluid supply for the torque converter operating chamber. Such an arrangement is illustrated by the engine driven pump 76 which may be driven by shaft 64 and pumps fluid from sump 77 by intake line 78 and delivers fluid to main line 79 at a pressure regulated by main line regulator valve 81 which directs overage to the converter inlet line 82 to supply the operating chamber of the torque converter 36. The fluid pressure in the operating chamber is regulated by a relief valve 83 in the converter outlet line which may include a cooler and lubrication system and returns the fluid to sump 77. The pump 76 may also be located in the transmission and driven by the transmission input shaft. The main line 79 supplies the engine governor 88 driven by shaft 64 to provide in line 89 a governor pressure varying proportionally to the square of engine speed or transmission input speed.

A throttle pressure signal regulator 90 has in a valve body 91 fixed to the housing 177, an inlet chamber 92 and an outlet chamber 93 separated by a central wall 94. A valve rod 96 is reciprocally mounted and sealed in bore 97 in end wall 98 of chamber 92 and connected at one end by pin and slot connection 99, a radial slot in the lever and a pin on the rod, for movement in all positions with throttle lever 63. The rod 96 has a contoured or shaped throttle plug member 101 variably controlling the restriction of opening 102 in wall 94. The main line 79 is connected by branch 100 to inlet chamber 92. The throttle lever 63 controls the position of throttle member 101 in opening 102 to variably control the flow restriction and thus provide in outlet chamber 93 and throttle pressure signal line 103, a throttle pressure signal varying as a function of throttle position increasing as the throttle moves from closed position to intermediate position, a low range of throttle positions, determined by the contour of plug 101. As explained below, the throttle signal pressure actuates the throttle responsive positioner 157 to position the stator vanes as indicated by the initial portion S-T of the stator vane opening or angle curve VO of FIG. 3.

The throttle lever 63 also has a lost motion pin and slot connection 106, a circumferential slot in the lever and a pin on rod 107 connected to bell crank 108 centrally pivoted to the housing and connected at the other end to the fuel control 58. The bell crank is biased to idle position by return spring 109 against the idle stop 111 on the housing and remains in this position as the throttle lever 63 is moved from intermediate position to closed position and moves with the throttle lever 63 as the throttle lever is moved from intermediate position to full throttle position to provide the manual throttle signal for fuel control 58.

The speed signal control 116 provides in response to the governor pressure signal in line 89 a modified speed signal in line 117. The speed signal control 116 has a cylinder bore 118, an intermediate diameter chamber bore 119 and a small guide bore 121 in valve body 91. The chamber bore 119 is divided by sealing wall 122 adjacent the cylinder bore 118 and a restriction wall 123 adjacent the guide bore 121. A piston and valve member 126 has a piston 127 reciprocating and sealed in cylinder bore 118 for movement between stop shoulder 128 between the cylinder bore 118 and chamber bore 119 and stop shoulder 129 provided by the cylindrical sleeve 131 secured in cylinder bore 118. The piston 127 is secured to piston rod 132 which extends through a sealing guide 133 fixed to closure wall 122 and has an annular metering plug 134 having a contoured surface positioned in restriction opening 136 in wall 123 to provide a controlled variable flow restriction. The contoured surface has a small end 137 near the piston and a larger end 138 remote from the piston. At the remote end a guide rod 139 extends into the guide bore 121. A passage 141 prevents entrapped fluid preventing valve movement but may be restricted for damping. A clearance or groove between the guide rod 139 and bore 121 may be used in place of passage 141. An end wall 142 suitably secured to the valve body closes cylinder bore 118, secures sleeve 131 in place and provides an abutment for spring 143 which engages and biases piston 127 in a valve opening direction. Exhaust 144 vents the spring chamber end of bore 118. The governor pressure chamber 146 between the closure wall 122 and piston 127 is supplied with governor pressure by branch 147 of governor line 89 and governor flow is maintained by restricted exhaust 148 so that when the volume of chamber 146 is diminishing due to piston movement by spring 143 the governor pressure in chamber 146 does not have a surge increase. Governor pressure in chamber 146 acts on piston 127 in a valve restriction closing direction. The inlet chamber 151 between closure wall 122 and restriction wall 123 receives governor pressure by branch 152 of governor line 89 which flows through the controlled restriction provided by restriction plug 134 and opening 136 to outlet chamber 153 to provide therein and in controlled speed signal line 117 a speed signal pressure varying or increasing as a controlled function of, or with, increasing engine speed. The speed signal pressure actuates speed responsive positioner 158 to control vane angle or closure as indicated by portion T-W-U of vane opening curve VO.

The stator blade angle positioning mechanism 156 includes a throttle responsive positioner 157 and a speed responsive positioner 158 cooperatively acting to determine blade angle or closure in response to throttle position and engine speed to match engine power. The throttle positioner 157 has a cylinder 161 having a central cylinder bore 162 and smaller diameter end bores 163 and 164 respectively providing stop shoulders 166 and 167 to limit movement of piston 168 which is reciprocally mounted and sealed in bore 162. An end plate 171 secured to cylinder 161 closes bore 163 and provides throttle signal pressure control chamber 172 between the end wall and piston. The end wall 171 has a pivot ear 173 pivoted by pin 174 to pivot ear 176 fixed to the housing 177 providing a hinged mounting for cylinder 161. At the opposite end, wall 178 has a guide 179 for piston rod 181 secured to piston 168. Spring 182 seated between end wall 178 and piston 168 biases the piston in a blade angle closing direction to engage shoulder 166. Exhaust 183 vents the spring chamber end of bore 162 to prevent accumulation of leakage fluid interfering with operation of the positioner 157. The throttle pressure chamber 172 is connected to the throttle pressure signal line 103 to bias piston 168 in a stator blade opening direction and to a restricted exhaust 184 to reduce surges in throttle signal pressure. The main line 79 has a branch 186 having normally closed solenoid valve 187 therein connected to chamber 172.

The speed positioner 158 has a cylinder 191 having a central cylinder bore 192 for piston 193 and a reduced diameter end bore 194 forming a shoulder 195 at one end of the cylinder bore and a sleeve 196 at the other end providing a stop shoulder 197 at the other end of the cylinder bore. The bore 194 is closed by end wall 198 forming speed signal pressure chamber 199 between it and piston 193. A suitable fastener 201, threads and a lock nut, secures the throttle positioner piston rod 181 to end wall 198 of cylinder 191. The opposite end wall 202 is secured to cylinder 191 and to sleeve 196 to secure the assembly and has a guide 203 to reciprocatingly guide piston rod 204 which is secured to piston 193. A spring 206 seated between end wall 202 and piston 193 biases the piston in a stator blade closing direction. The controlled speed signal pressure line 117 is connected to chamber 199 to bias piston 193 in a stator blade opening direction. Chamber 199 is also connected to exhaust line 207 which is connected, through bypassing normally closed solenoid valve 208, to restricted exhaust 209. This normally closed solenoid valve 208 may, in the normally closed position, provide restricted flow to exhaust 210, replacing restricted exhaust 209 to prevent pressure surges in chamber 199 when the volume of the chamber is diminished and on opening provides full flow to exhaust. The spring chamber end of cylinder bore 192 is vented by exhaust 211 to prevent accumulation of leakage fluid interfering with the positioner operation. The speed position piston rod 204 is pivotally connected by pin 212 to control lever 213 pivotally mounted by pin 214 on the housing 177. A conventional servo mechanism 216, mounted on housing 177, is supplied with fluid pressure by main line 79, has an input rod 217 connected by pin and slot connection 218 to lever 213 to actuate the servo and a servo vane to actuate the sleeve portion of the servo valve and load rod 219 connected by a pin and slot connection 221 to control lever 222 fixed to stator blade angle control shaft 53. Such a conventional servo mechanism 216 is shown at pages 3–36 and 37, FIG. 3.31 of the Control Engineers' Handbook by John G. Truxal published by McGraw Hill Book Company in 1958 incorporated herein by reference. The servo mechanism positions lever 222 in accordance with the position of lever 213 by the positioner 156 and prevents vane reaction forces being transmitted to the positioner. The pivot pin 212 end of speed positioner piston rod 204 moves in an arc so that the coaxially arranged speed position 158 and throttle positioner 157 pivot a little about pivot 174 which is parallel to pivot 214 and shaft 53. Thus pressure lines 103, 186, 117 and 207 which extend from a fixed control valve to positioner 156 are flexible. Solenoid valve 208 may be fixed on speed positioner 158 and a flexible electric lead employed. Exhausts 183, 184 and 211 are bleed holes draining to the sump. Also, throttle positioner 157 could be fixed and speed positioner 158 axially movable with rod 204 in an axial guide and a radial slot in lever 213 for a pin and slot connection 212 like such connection 218.

The solenoid valves 187 and 208 are controlled by a D.C. electric power source, grounded battery 226, connected in series through speed switch 227 and manual switch 228 to conductor 229 which is connected in parallel to grounded normally closed solenoid valves 187 and 208. The speed switch has a normally closing pressure control device 231, typically a spring biased diaphragm normally holding switch 227 closed against low governor pressure supplied by governor line 89 to a chamber to act on the diaphragm. At a predetermining high governor pressure at rated engine speed the governor pressure moves the diaphragm against the spring and opens switch 227. The chamber is continuously vented by restricted exhaust 232 for quick switch operation. The throttle switch 228 has a contact on throttle lever 63 which engages a fixed contact and is closed only when the throttle lever is in the full throttle position as indicated by the dotted line position.

OPERATION

The power-speed relationships of the single shaft gas turbine engine 11 illustrated in FIG. 1 are plotted in FIG. 2. Solid line curves A, B and C represent variations in engine output power with engine speed, each at a different but constant level of turbine inlet temperature. Curve A is for the highest turbine inlet temperature for maximum power during steady-state operation increasing with speed to maximum engine rated power at point U at rated speed. If the engine fuel flow rate is reduced to decrease turbine inlet temperature, less power, any combination of power and speed below curve A, is developed by the engine. At constant temperatures less than the maximum allowable, curve A, a representative intermediate value, the variation of power with speed is indicated by curve B and at a still lower turbine inlet temperature, the variation of curve C results. At idle speed the governor controlled fuel feed control can very idle power between S and T respectively on curves C and B if such power is requred at idle speed by the transmission. Once the engine is connected to the torque converter 35, however, it can produce only the power at any given speed that the torque converter input element, pump 38, will absorb. Thus the torque converter power capacity, ability to absorb power, determines steady state engine power. With the torque converter stator vanes 44 set at their maximum power design position, full open, the torque converter absorbs power or has a power capacity in accordance with the cubic curve M (dash line). This torque converter has absorption or capacity characteristics entirely dependent or substantially entirely dependent on input speed and independent or substantially independent of output speed. When the engine is run at rated speed, the power absorbed by the torque converter exactly matches the capability of the engine because of the coincidence of the upper extremities of curves A and M at point U, FIG. 2. In the low speed range of the engine, the torque converter input element 38 demands more power than the engine is capable of producing without exceeding allowable turbine inlet temperature, as indicated by the fact that curve M lies above curve A. The torque converter stator vanes are partially closed by turning the control rod with the speed governor, so the torque converter absorption characteristic follows a curve N (dash line) of lesser magnitude. By further closing the stator vanes, torque converter absorption capacity is decreased, lower curve P (dash line). By proper control of the torque converter stator vanes, the characteristics of the torque converter are made to match the characteristics of the engine and the needs of the vehicle. As the throttle lever is advanced from closed to intermediate positions engine power will increase gradually on the solid line portion of curve L at idle speed and then with advancing engine throttle power will increase at different rates, dashed portions of curve L, depending on engine speed for a smooth vehicle start.

This control system during steady state operation schedules the torque converter stator vane angle or opening as shown by curve VO in FIG. 3, a plot of stator vane position schedule against throttle position. The corresponding variation in engine speed is shown by curve ES at the top of FIG. 3 on a plot of engine speed against throttle position. Starting at the right extremity of vane opening curve VO and engine speed curve ES of FIG. 3, with the engine at rated speed and the throttle wide open, operation is represented by the point U. The engine is at maximum rated speed and power and the stator vanes are at maximum opening for maximum rated capacity, a position corresponding to the coincidence of curves A and M at point U, FIG. 2. As the throttle is closed to reduce power output and engine speed, the stator vanes are initially kept in this position and the torque converter forces the engine to follow the power-speed relationship of curve M in FIG. 2. This portion of the operating spectrum is represented by the horizontal line portion U-W of vane opening curve VO, FIG. 3. As engine speed approaches idle, however, as has been discussed above, the torque converter with the vanes in maximum position would force the engine to run at an excessive temperature. To circumvent this problem the stator control rod is turned to partially close the torque converter stator vanes as a function of speed as shown by the portions W-T of speed curve ES and vane opening curve VO. Such reduction of speed and vane opening causes torque converter power capacity and thus engine power to be reduced below curve M, FIG. 2 and follow dot dash curve W-T to be at power capacity curve N at idle speed to provide a substantial engine to torque converter capacity power match. At point T the engine is at a slow speed, i.e., idle speed, still develops sufficient power to cause objectionable creep or low speed drive of the vehicle due to the low, but not minimum, torque converter capacity at point T. When standing operation is desired, the throttle is further closed toward the fully closed position at point S in FIG. 3, the engine fuel control maintains the engine at a constant idle speed while the torque converter stator vanes continue to be rotated from T to the closed position S on curve VO, reducing torque converter capacity to the minimum and dropping engine power vertically from T to S in FIG. 2, to the intersection of curve P with the engine idle speed ordinate.

In addition to the above described steady state operation of the control system, there are a number of non-steady state situations. During engine starting, the throttle is in the closed position, with fuel flow being controlled directly by the fuel control for idle speed as indicated by point S of engine speed curve ES, and the stator vanes are closed, point S on vane opening curve VO, to reduce drag on the starter, as indicated by point S of torque converter capacity curve P. Whenever the engine throttle is depressed from some partial open position to provide maximum acceleration, the stator vanes are immediately switched to an intermediate position such as point V on the vane opening plot and provide initially reduced capacity as shown by dotted curves F or F' to curve N in FIG. 2. Then with increasing speed capacity increases on curve N to point V. By closing the stator vanes, e.g., 45° from normal for maximum rated capacity curve M to curve N, FIG. 2, the vehicle covers a greater distance in a given time. Once rated engine speed is reached, the vanes are immediately switched, from the accelerating position V to U in FIG. 3, curve N to M in FIG. 2. During the engine braking operation the coasting vehicle feeds power through the torque converter output element 41 into the one-way clutch 50, which locks the vehicle to the engine shaft and permits use of the engine compressor as a brake.

The stator control 56, shown in detail in FIG. 4, rotatably positions shaft 53 and the stator blades or vanes 44 as a function of engine speed and throttle opening to provide the above discussed vane opening schedule. This stator control is included in the same housing with the fuel control 58 and the source 76 of main line control pressure, the governor and throttle lever preferably are common controls for both the fuel and stator control systems. The vehicle operator controls the engine by a hand lever or foot pedal, such as a throttle lever 63, connected to the fuel and stator controls. The throttle control lever 63 for controlling the stator control 56 moves from closed position to intermediate position for closed to intermediate position control of the stator vanes while the fuel control 58 remains in idle position. A lost motion pin and slot connection 106 is used between throttle lever 63 and bell crank lever 108 which operates the fuel control so the fuel control remains in idle position as throttle lever 63 moves from closed to intermediate position. When the throttle control lever 63 is moved from intermediate position to full throttle position both the throttle lever 63 and bell crank lever 108 move together. The throttle lever 63 acting through bell crank lever 108 provides the throttle position input signal which acts on an engine speed governor driven by shaft 64 to control in conjunction with temperature controls responsive to an engine turbine signal and ambient air controls responsive to ambient air temperature and pressure signals to control fuel feed as shown by the above fuel feed control patents for engine operation capable of providing full power, curve A or any lesser power. The fuel supplied by the fuel pump of the fuel control is delivered through the fuel line 62 to the fuel nozzle 19.

The stator control 56 positions the stator vanes 44 in the torque converter, as described above, in accordance with vane opening curve VO of FIG. 3. At low engine power output this calls for variation of stator position with throttle position S-T to increase torque converter power capacity to increase engine power at constant engine idle speed, as controlled by the fuel control 58. At increased throttle opening and engine power, the engine speed increases from idle to rated speed and the stator position becomes a function of engine speed as shown by vane opening curve portion T-W modifying inherent torque converter power capacity curve M, to provide matching power capacity curve T-W-U. For maximum vehicle performance, as signalled when the operator moves the throttle to its full open position, the stator vanes assume a fixed position, irrespective of engine speed, indicated by V in FIG. 3. When the engine reaches rated speed the vanes then change to position U of FIG. 3 to provide for delivery of maximum rated engine power to the transmission operating at maximum rated capacity. The operation under steady state conditions is described as follows. At low power, with the engine operating at idle speed, the angular position of shaft 53 to position the vanes in the S-T portion of vane opening curve VO is determined by throttle positioner 157, supplied with the throttle pressure signal varying as a function of throttle position or torque demand in line 103 controlled by throttle signal regulator 90. At higher power output the angular position of shaft 53 to position the vanes in the T-U portion of vane opening curve VO is determined by speed controller 116, supplied with a speed function pressure signal in line 117. Partial throttle positions between the intermediate position and full throttle provide the same vane opening in so far as the throttle control is concerned but normally result in lower engine speed which may reduce vane opening. Positioning the stator for full throttle acceleration is provided by the throttle control closing throttle switch 228 to complete a circuit through the normally closed speed switch 227, and then quickly changing it to the speed switch position when rated engine speed is reached by opening speed switch 227 at rated speed.

Main line 79 is fed with oil at constant pressure provided by oil pump 76 and pressure regulator 81. Line 89 is supplied with oil at a governor pressure proportional to the square of engine shaft speed by conventional governor 88. Control of stator position under steady state operating conditions at low power output and constant engine speed and then with increasing power and speed is described below. Torque converter capacity and thus engine power is increased by rotating throttle lever 63 in the counter-clockwise direction about fixed pivot 71 from the closed position to the intermediate position. The movement of the throttle lever moves rod 96 to the right, withdrawing specially shaped plug 101 from restriction 102. The constant main line pressure from branch 100 of main line 79 delivered to chamber 92. A continuous flow path is provided for the flow of oil through restriction 102 into chamber 93, then through line 103, through chamber 172 of throttle positioner 157 and restricted exhaust 184, which dumps oil back to the sump for improved regulation by the controlled restriction. The annular restriction surrounding plug 101 throttles the pressure in chamber 93 to a level which increases as throttle lever 63 is advanced. This throttle signal pressure, a function of throttle lever position, is transferred to chamber 172 of throttle positioner 157. There it acts to move piston 168 to the right, against the compression spring 182. When the throttle lever is in the fully closed position, the oil pressure in chamber 172 is low and the spring 182 forces piston 168 against shoulder 166. This determines closed stator position at closed position of the throttle lever at idle speed, as shown at point S of vane opening curve VO an engine speed curve ES, FIG. 3 and idle engine power and torque converter capacity, FIG. 2. When the throttle lever is opened, moved from closed position to intermediate position, to provide for the maximum allowable stator opening at idle speed, point T on vane opening curve VO in FIG. 3, the throttle signal pressure in chamber 172 is sufficiently high to force piston 168 against shoulder 167. Further opening of throttle lever 63 will further increase throttle signal pressure but has no effect on the position of piston 168, which remains held against shoulder 167. As the throttle lever is moved beyond intermediate position to full throttle position, the fuel control 158 provides increased fuel feed to increase engine speed within over speed and over temperature limits. The engine speed governor pressure signal in line 89 now begins to increase with the square of engine speed. Governor pressure is delivered through line 89 and branch 147 to chamber 146 and through line 89 and branch 152 to chamber 151. The pressure in chamber 146 forces piston 127 against compression spring 143. The oil in chamber 146 discharges through restricted exhaust 148 to the sump. The oil in chamber 151 passes through restriction 123, partially blocked by plug 134, into chamber 153. During the time the engine is at idle speed, spring 143 is strong enough to hold piston 122 against shoulder 128. Thus during variable power operation at idle speed, plug 134 is in a fixed position relative to restriction 123, and the pressure in chamber 153 is constant. Once engine speed increases, the rising pressure in chamber 146 forces piston 127 to the right, simultaneously changing the annular metering or restricting area around plug 134 which is contoured to provide a schedule of pressure in chamber 153 as a function of engine speed. This pressure is delivered to line 117 to chamber 199 in speed positioner 158. The casing or cylinder 191 of positioner 158 is fixed to piston 168 through rod 181. Thus as piston 168 moved to the right with increasing throttle as described above, the entire casing or cylinder 191 of positioner 158 is simultaneously moved to the right with respect to the pivoted ground connection 174. As the pressure in chamber 199 increases with rising engine speed, in accordance with the desired schedule, piston 193 is forced to the right against compression spring 206 to increase vane opening on portion T-W of curve VO. The rod 204 connected to arm 213 actuates servo 216 to cause arm 222 and shaft 53 to rotate clockwise to open the torque converter stator vanes. At point W piston 193 rests against shoulder 197, limiting maximum stator opening which is maintained to point U. Referring to FIG. 3, it is thus seen that at point S piston 168 is against shoulder 166 and piston 193 is at its extreme left position against shoulder 195. At point T piston 168 is against shoulder 167 and the position of piston 193 remains unchanged. At points W and U, piston 168 is against shoulder 167 and piston 193 is against shoulder 197. The foregoing description has covered operation at idle and steady state operating conditions up to maximum power. A means for suddenly switching the stator vanes in during full throttle acceleration, from any vane angle or opening position between T and U on vane opening curve VO, FIG. 3, to a high acceleration performance position V is provided. During normal steady state operation, as described above, pressure control device 231 closes speed switch 227. This completes the electrical path from battery 226 to switch 228. During part throttle operation the circuit is broken by switch 228. With the circuit open, due to either or both speed switch 227 and throttle switch 228 being open, the normally closed solenoid valve 187 is closed blocking main line branch 186 and the normally closed solenoid valve 208 is closed, preventing exhaust from chamber 199 except for a restricted exhaust 209. When the throttle lever 63 is moved to the full throttle maximum power position, at less than rated speed so switch 227 is closed, the throttle lever closes throttle switch 228, causing solenoid valve 187 to open main line branch 186 and solenoid valve 208 to open an unrestricted passage to exhaust 210. Opening valve 187 allows the regulated pressure of line 79 to flow directly to chamber 172, forcing piston 168 against shoulder 167. Opening valve 208 permits the oil in chamber 199 to drain freely and directly to the sump, allowing spring 206 to force piston 193 against shoulder 195. The proportions of positioners 151 and 138 are such that with piston 180 against shoulder 167 and piston 193 against shoulder 196, the desired stator position for full throttle acceleration, indicated by V in FIG. 3, is provided. Once maximum engine speed is reached the stator vanes are closed to position U of FIG. 3 to achieve maximum output. Governor pressure in line 89 at rated or maximum engine speed actuates the pressure responsive control device 231 to open switch 227 to open the circuit to de-energize the normally closed solenoid valves 187 and 208 to restore the system to the above steady state operating mode. Oil flow is maintained through the pressure control device by exhausting the flow through restricted exhaust 232.

It will be appreciated that the above described preferred embodiments may be modified within the concept of the invention.

It is claimed:

1. In a power train; an input member providing an input drive adapted to be driven by an engine; a load member for driving a load; a hydrokinetic torque converter having a stationary housing, a pump connected to said input member, a turbine connected to said load member, a stator and variable capacity means movable from a full rated power capacity position through a range of positions including an intermediate power capacity position to a closed minimum power capacity position operative to provide variable power capacity drive to the turbine; a throttle control means having a throttle lever movable from a closed position through a first range of movement to an intermediate position for providing idle speed fuel feed for engine variable power and from intermediate position through a second range of movement for providing increasing fuel feed to full rated engine power position to provide input member power increasing as a function of input member speed; and capacity control means operatively connected to said variable capacity means and said throttle control means operative in response to movement of said throttle control lever from said closed position to said intermediate position to move said variable capacity means from said closed position to increase capacity as a function of throttle lever movement to increase idle speed power capacity with increased idle fuel feed.

2. In a power train; an input member providing an input drive adapted to be driven by an engine; a load member for driving a load; a hydrokinetic torque converter having a stationary housing, a pump connected to said input member, a turbine connected to said load member, a stator and variable capacity means movable from a full rated power capacity position to a minimum power capacity position operative to provide variable power capacity drive increasing from a minimum to full rated power capacity; throttle control means having a throttle lever movable from a closed position through a first range of movement to an intermediate position for providing idle speed fuel feed for maintaining idle speed with variable engine power throughout the first range of movement and movable from intermediate position through a second range of movement for providing increasing fuel feed to full rated engine power fuel feed at full throttle position to provide input member power increasing as a function of input member speed; capacity control means operatively connected to said variable capacity means and said throttle control means operative in response to movement of said throttle lever from closed position to intermediate position to increase said power capacity from said minimum to a higher power capacity to increase the fuel feed at idle speed to increase idle speed power.

3. In a power train; an input member providing an input drive adapted to be driven by an engine; a load member for driving a load; a hydrokinetic torque converter having a stationary housing, a pump connected to said input member, a turbine connected to said load member and a stator having variable pitch vanes movable from an open full rated power capacity position through a range of positions including an intermediate power capacity position to a closed minimum power capacity position operative to provide power capacity drive increasing as a function of input member speed to full rated power capacity at rated speed when the vanes are in the open position and power capacity decreasing to minimum power capacity as the vanes are moved to the closed position; throttle control means having a throttle lever movable from a closed position through a first range of movement to an intermediate position for providing idle speed fuel feed for maintaining idle speed with variable engine power throughout the first range of movement and movable from intermediate position through a second range of movement for providing increasing fuel feed to full rated engine power fuel feed at full throttle position to provide input member power increasing as a function of input member speed; and stator vane positioner means operatively connected to said vanes and said throttle control means operative in response to movement of said throttle lever from closed position to intermediate position to increase said power capacity from said minimum to said intermediate power capacity to increase the fuel feed at idle speed to increase idle speed power.

4. The invention defined in claim 3 and said throttle lever at full throttle actuating said stator vane positioner means to position said stator vanes in said intermediate position at speeds less than said rated speed.

5. In a power train; an input member providing an input drive adapted to be driven by an engine; a load member for driving a load; a hydrokinetic torque converter having a stationary housing, a pump connected to said input member, a turbine connected to said load member, a stator and variable capacity means movable from a full rated power capacity position through a range of positions including an intermediate power capacity position to a minimum power capacity position operative to provide power capacity drive increasing from a minimum to full rated power capacity as a function of speed to full rated power capacity at rated speed; throttle control means movable through a range of movement for providing idle speed fuel feed and increasing fuel feed to full rated engine power at full throttle position to provide input member power increasing as a different function of input member speed; speed governor means operatively connected to said input member providing a speed signal and capacity control means operatively connected to said variable capacity means, said throttle control means and said governor operative in response to movement of said throttle control means and said speed signal to modify said power capacity function relative to speed to substantially match the input member power function as input member speed increases from idle speed to rated speed.

6. The invention defined in claim 5 and said throttle control means in full throttle position controlling said capacity control means to reduce the capacity of said variable capacity means from full rated capacity at speeds less than said rated speed.

7. In a power train; an input member providing an input drive adapted to be driven by an engine; a load member for driving a load; a hydrokinetic torque converter having a stationary housing, a pump connected to said input member, a turbine connected to said load member and a stator having variable pitch vanes movable from an open full rated power capacity position through a range of positions including an intermediate power capacity position to a closed minimum power capacity position operative to provide power capacity drive increasing as a function of input member speed to full rated power capacity at rated speed when the vanes are in the open position and power capacity decreasing to minimum power capacity as the vanes are moved to the closed position; throttle control means movable through a range of movement for providing idle speed fuel feed and increasing fuel feed to full rated engine power at full throttle position to provide input member power increasing as a different function of input member speed; speed governor means operatively connected to said input member providing a speed signal and stator vane positioner means operatively connected to said vanes, said throttle control means and said governor operative in response to movement of said throttle control means and said speed signal to modify said power capacity variable rate function to substantially match input member power variable rate function as input member speed increases from idle speed to rated speed.

8. In a power train; an input member providing an input drive adapted to be driven by an engine; a load member for driving a load; a hydrokinetic torque converter having a stationary housing, a pump connected to said input member, a turbine connected to said load member and a stator having variable pitch vanes movable from an open full rated power capacity position through a range of positions including an intermediate power capacity position to a closed minimum power capacity position operative to provide power capacity drive increasing as a function of input member speed to full rated power capacity at rated speed when the vanes are in the open position and power capacity decreasing to minimum power capacity as the vanes are moved to the closed position; throttle control means movable from a closed position through a first range of movement to an intermediate position for providing idle speed engine fuel feed throughout the first range of movement and movable from intermediate position through a second range of movement for providing increasing fuel feed to full rated engine power at full throttle position to provide input member power increasing as a different function of input member speed; speed governor means operatively connected to said input member providing a speed signal and stator vane positioner means operatively connected to said vanes, said throttle control means and said governor operative in response to movement of said throttle control and said speed signal to modify said power capacity function to substantially match input member power function as input member speed increases from idle speed to rated speed.

9. In a power train; an input member providing an input drive adapted to be driven by an engine; a load member for driving a load; a hydrokinetic torque converter having a stationary housing, a pump connected to said input member, a turbine connected to said load member and a stator having variable pitch vanes movable from an open full rated power position through a range of positions including an intermediate power high performance position to a closed minimum power position and connected to said housing to provide reaction torque operative when the pump is driven to provide a power capacity drive to the turbine varying essentially as a function of input member speed having full rated power capacity when the vanes are in said open position, intermediate capacity when the vanes are in intermediate position and minimum capacity when the vanes are in the closed position; throttle control means movable from a closed position through a first range of movement to an intermediate position for providing idle speed engine fuel feed throughout the first range of movement and movable from intermediate position through a second range of movement for providing increasing fuel feed to full rated engine power at full throttle position to provide input member power increasing as a different variable function of input member speed; speed governor means operatively connected to said input member providing a speed signal and stator vane positioner means operatively connected to said vanes, said throttle control means and said governor operative in response to movement of said throttle control means from said closed position to said intermediate position to move said vanes from said closed position to said intermediate position as a function of throttle movement to provide intermediate power capacity and to movement of said throttle control means from said intermediate position to said full throttle position to move said vanes from said intermediate position to said maximum capacity position as a function of said speed signal to modify said power capacity to substantially match input member power as input member speed increases from idle speed to rated speed.

10. In a power train, an input member providing an input drive adapted to be driven by an engine; a load member for driving a load; a hydrokinetic torque converter having a stationary housing, a pump connected to said input member, a turbine connected to said load member and a stator having variable pitch vanes movable from an open full rated power position through a range of positions including an intermediate high performance position to a closed minimum power position and connected to said housing to provide reaction torque operative when the pump is driven to provide a power capacity drive to the turbine varying essentially as a cubic exponential function of input member speed having full rated power capacity when the vanes are in said open position, decreasing power capacity as the vanes are moved toward the closed position, an intermediate capacity for full idle power at idle speed and high performance at higher speeds when the vanes are in a central intermediate position and minimum capacity when the vanes are in the closed position; throttle control means movable from a closed position through a first range of movement to an intermediate position for providing idle speed fuel feed with variable engine power throughout said first range of movement and movable from intermediate position through a second range of movement for providing increasing fuel feed to full rated engine power at full throttle position to provide input member power increasing as a variable function of input member speed; speed governor means operatively connected to said input member providing a speed signal and stator vane positioner means operatively connected to said vanes, said throttle control means and said governor operative in response to movement of said throttle control means from said closed position to said intermediate position to move said vanes from said closed position to said intermediate position as a function of throttle control means movement to provide idle speed power capacity substantially equal to increasing idle speed input member power and during movement of said throttle control means from said intermediate position to said full throttle position to move said vanes from said intermediate position to said fully open maximum capacity position as a function of said speed signal to modify said power capacity to substantially match input member power as input member speed increases from idle speed to rated speed.

11. The invention defined in claim 10 and said throttle control means in full throttle position controlling said stator vane positioner to place said vanes in said intermediate position at speeds less than said rated speed.

12. In a power train; a single shaft gas turbine engine providing power varying as a variable rate function of engine speed up to rated power at rated speed, an input member driven by said engine; a load member for driving a load; a hydrokinetic torque converter having a stationary housing, a pump connected to said input member, a turbine connected to said load member, a stator and variable capacity means movable from full power capacity position through a range of positions to a minimum power capacity position; throttle control means connected to said engine having a throttle lever movable from a closed position through a first range of movement to an intermediate position providing idle speed fuel feed for maintaining idle speed with increased power for said engine throughout the first range of movement and movable from intermediate position through a second range of movement providing increasing fuel feed to full rated power at rated speed at full throttle; and capacity control means operatively connected to said variable capacity means, and said throttle control means operative in response to movement of said throttle lever from said closed position to said intermediate position to move said variable capacity means from said closed position to said intermediate position as a function of throttle movement to provide increased idle speed power capacity and substantially equally increased idle speed engine power.

13. In a power train; a single shaft gas turbine engine providing power varying as a variable rate function of engine speed up to rated power at rated speed, an input member driven by said engine; a load member for driving a load; a hydrokinetic torque converter having a stationary housing, a pump connected to said input member, a turbine connected to said load member and a stator having variable pitch vanes movable from an open full rated power capacity position through a range of positions including an intermediate power capacity position to a closed minimum power capacity position and connected to said housing to provide reaction torque operative when the pump is driven to provide a power capacity increasing with input member speed; throttle control means connected to said engine having a throttle lever movable from a closed position through a first range of movement to an intermediate position providing idle speed fuel feed for maintaining idle speed with variable power for said engine throughout the first range of movement and movable from intermediate position through a second range of movement providing increasing fuel feed to full rated power at rated speed at full throttle; and stator vane positioner means operatively connected to said vanes and said throttle control means operative in response to movement of said throttle lever from said closed position to said intermediate position to move said vanes from said closed position to said intermediate position as a function of throttle movement to increase idle speed power capacity and cause increased idle speed engine power.

14. In a power train; a single shaft gas turbine engine providing power varying as a variable rate function of engine speed up to rated power at rated speed, an input member driven by said engine; a load member for driving a load; a hydrokinetic torque converter having a stationary housing, a pump connected to said input member, a turbine connected to said load member, a stator and variable capacity means movable from a full power capacity position through a range of positions to a minimum power position; throttle control means connected to said engine having a throttle lever movable from a minimum position to full throttle; speed governor means operatively connected to said input member providing a speed signal and capacity control means operatively connected to said variable capacity means, said throttle control means and said governor operative in response to movement of said throttle lever from said minimum position to said full throttle position to control said variable capacity means as a function of said speed signal to modify said power capacity to substantially match engine power as engine speed increases from idle speed to rated speed.

15. The invention defined in claim 14 and said throttle control means in full throttle position controlling said capacity control means to reduce the capacity of said variable capacity means from full rated capacity at speeds less than said rated speed.

16. In a power train; a single shaft gas turbine engine providing power varying as a variable rate function of engine speed up to rated power at rated speed, an input member driven by said engine; a load member for driving a load; a hydrokinetic torque converter having a stationary housing, a pump connected to said input member, a turbine connected to said load member and a stator having variable pitch vanes movable from an open full rated power position through a range of positions to a closed minimum power position and connected to said housing to provide reaction torque operative when the pump is driven to provide a power capacity drive to the load member varying as another rate function of input member speed having the same full rated power capacity at rated speed as engine rated power at engine rated speed when the vanes are in the open position and decreasing power capacity as the vanes are moved toward minimum capacity in the closed position; throttle control means connected to said engine movable through a range of movement providing idle speed fuel feed for said engine and increasing fuel feed to full rated power at rated speed at full throttle; speed governor means operatively connected to said input member providing a speed signal and stator vane positioner means operatively connected to said vanes and said governor operative in response to movement of said throttle control through said range of movement to move said vanes to control the torque converter power capacity to substantially match engine power as engine speed increases from idle speed to rated speed.

17. In a power train; a single shaft gas turbine engine providing power varying as a variable rate function of engine speed up to rated power at rated speed, an input member driven by said engine; a load member for driving a load; a hydrokinetic torque converter having a stationary housing, a pump connected to said input member, a turbine connected to said load member and a stator having variable pitch vanes movable from an open full rated power position through a range of positions including an intermediate position to a closed minimum power position and connected to said housing to provide reaction torque operative when the pump is driven to provide a power capacity drive to the load member varying essentially as another rate function of input member speed having full rated power capacity increasing at a low rate and being greater than engine power at low speeds and increasing at a higher rate at higher speed and substantially equalling engine rated power at engine rated speed when the vanes are in the open position and decreasing power capacity as the vanes are moved through intermediate position to minimum capacity in the closed position; throttle control means connected to said engine movable from a closed position through a first range of movement to an intermediate position providing idle speed fuel feed for said engine throughout the first range of movement and movable from intermediate position through a second range of movement providing increasing fuel feed to full rated power at rated speed at full throttle; speed governor means operatively connected to said input member providing a speed signal and stator vane positioner means operatively connected to said vanes, said throttle control means and said governor operative in response to movement of said throttle control means from said closed position to said intermediate position to move said vanes from said closed position to said intermediate position as a function of throttle control means movement to provide idle speed power capacity substantially equal to idle speed engine power and during movement of said throttle control from said intermediate position to said full throttle position to move said vanes from said intermediate position to said maximum capacity position as a function of said speed signal to modify said power capacity to substantially match engine power as engine speed increases from idle speed to rated speed.

18. The invention defined in claim 17 and said throttle control means in full throttle position controlling said stator vane positioner to place said vanes in said intermediate position at speeds less than said rated speed.

19. The invention defined in claim 18 and said throttle control means providing a throttle pressure signal; said speed governor means providing a governor pressure signal; said stator vane positioner means including a housing, a throttle positioner and a governor positioner each including a cylinder with a piston having a limited stroke therein and a rod fixed to the piston extending out of one end of the cylinder and mounting means at the other end of the cylinder, the mounting means of the throttle cylinder being pivotally mounted to the housing, the mounting means of the governor cylinder being fixed to the throttle rod, servo linkage means connecting said governor rod to said vanes to provide the force to vary the angle without reaction on said governor rod, a spring in each cylinder at the piston rod end biasing both positioners to closed position and said throttle and governor pressure signals being connected respectively to the opposite end of said throttle and governor cylinders operative from a closed position in response to throttle pressure at intermediate position to stroke said throttle piston while said governor piston and rod transmit movement to said linkage means for intermediate vane position and said governor pressure increasing to stroke said governor piston and rod while the throttle positioner provides any needed reaction to move said linkage means for maximum vane position.

* * * * *